United States Patent [19]
Gebauer et al.

[11] Patent Number: 5,468,783
[45] Date of Patent: Nov. 21, 1995

[54] MODIFIED AROMATIC POLYISOCYANATES AND THEIR USE FOR THE PRODUCTION OF RIGID FOAMED MATERIALS

[75] Inventors: Herbert Gebauer, Krefeld; Pramod Gupta, Bedburg; Christian König, Kaarst, all of Germany

[73] Assignee: Bayer Aktiengesellschaft, Leverkusen, Germany

[21] Appl. No.: 396,937

[22] Filed: Mar. 1, 1995

Related U.S. Application Data

[62] Division of Ser. No. 40,699, Mar. 31, 1993, Pat. No. 5,424,386.

[30] Foreign Application Priority Data

Apr. 8, 1992 [DE] Germany .......................... 42 11 774.7

[51] Int. Cl.⁶ .......................... C08G 18/00; C08G 18/10
[52] U.S. Cl. .............................. 521/159; 521/99
[58] Field of Search .......................... 521/159, 99

[56] References Cited

U.S. PATENT DOCUMENTS

| 4,304,708 | 12/1981 | Marx et al. | 260/37 R |
|---|---|---|---|
| 5,028,636 | 7/1991 | Gebauer et al. | 521/131 |
| 5,314,588 | 5/1994 | Zarnack et al. | 203/38 |

FOREIGN PATENT DOCUMENTS

| 257827 | 6/1988 | Germany . |
|---|---|---|
| 1434917 | 5/1976 | United Kingdom . |

*Primary Examiner*—James J. Seidleck
*Assistant Examiner*—R. F. Johnson
*Attorney, Agent, or Firm*—Joseph C. Gil; N. Denise Brown

[57] ABSTRACT

Polyaromatic polyisocyanates are modified by reaction with 0.1 to 10 weight %, preferably 2 to 7 weight % (based on polyisocyanate) of a polyether alcohol of molecular weight 206 to 948, obtainable by the reaction of alkylene oxides with $C_6$–$C_{30}$, preferably $C_8$–$C_{20}$, hydrocarbons containing 1 to 3 active H atoms, and are used for the production of rigid polyurethane foamed materials.

5 Claims, No Drawings

& nbsp;
MODIFIED AROMATIC POLYISOCYANATES AND THEIR USE FOR THE PRODUCTION OF RIGID FOAMED MATERIALS This application is a division of application Ser. No. 08/040,699, filed Mar. 31, 1993, issued as U.S. Pat. No. 5,424,386.

BACKGROUND OF THE INVENTION

The present invention relates to modified aromatic polyisocyanates and to the production of rigid roamed materials using such polyisocyanates which show a good compatibility towards alkanes used as blowing agents. The use of specially modified distillation bottoms from tolylene diisocyanate production is particularly preferred.

1. Field of the Invention

As is generally known, distillation bottoms are obtained in the production of tolylene diisocyanate ("TOI") which, in addition to monomeric TDI, contain various reaction products or secondary products, e.g. carbodiimides, uretoneimines, isocyanurates, uretdiones, and carbamides. This TDI residue adversely affects the economics of the production process and causes considerable technical problems relating to the thermal recycling of the distillation bottoms. Moreover, the disposal of distillation residues, such as these, on land-fill sites constitutes a severe threat to the environment.

Processes have recently become known which effect an improvement in the TOI yield and thus a reduction in the TOI bottoms (German Offenlegunschrift 2,850,60). A further process is described in East German Patent 257,827, in which a large part of the monomeric TDI is recovered from the bottoms by the addition of isocyanates of the diphenyl methane series ("MDI") to the TOI residue and subsequent distillation under vacuum. The residual content of free TDI is thus in the region of about 1%. In addition, an improvement in the yield of TOI monomer is obtained in this process by means of acid acceptors, wherein chlorine compounds of TDI are cracked. The residual fraction comprising the TDI bottoms and the MDI residues is recommended for the production of polyurethanes. However, there is no information as to how the residual fraction should be processed. Tests have shown that a polyisocyanate mixture such as this, comprising TDI and MDI fractions (a polyaromatic polyisocyanate mixture), can in principle be foamed using polyols and known halogen-containing foaming agents. However, rigid polyurethane foams are produced which are very brittle and which crumble easily, and which cannot be used in practice.

This is explainable, since the double thermal processing of the isocyanates (i.e., the mixture of non-distillable TDI polymer residues and MDI with its highly variable composition) can give rise to secondary products in the TDI and to compounds which are formed from the two isocyanates TDI and MDI, so that rigid polyurethane foams which meet the standard requirements cannot be obtained. The severe thermal processing conditions lead to a dark brown/grey foam coloration, which does not correspond to the state of the art.

To improve the properties of rigid polyurethane foamed materials required for industrial application thereof, monomeric or polymeric isocyanates of TDI and also of the MDI series have previously been modified with polyols based on ethers or esters.

When reaction of the above-mentioned polyisocyanate mixtures with ethylene oxide ("EO"), propylene oxide ("PO") and/or butylene oxide-polyether polyols based on TMP or propylene glycol to form urethane-containing polyisocyanates was attempted, a slight improvement in the foamed materials produced therefrom did result. The foam materials still did not correspond to the industry's requirements.

DESCRIPTION OF THE INVENTION

Surprisingly, it has now been found that polyether alcohols, which can be obtained by the reaction of alkylene oxides with $C_6$–$C_{30}$ hydrocarbons containing 1–3 active H atoms, produce a urethane-containing, polyaromatic polyisocyanate mixture on reaction with aromatic polyisocyanates, particularly with the above-mentioned polyaromatic isocyanate mixtures. This urethane-containing, polyaromatic polyisocyanate mixture is suitable for use as the polyisocyanate component for the production of rigid polyurethane foams or polyisocyanurate foams, wherein the known halogen-containing hydrocarbons can be used as the foaming agent, and alkanes, particularly pentane, or water, or mixtures thereof, can also be used.

The thermal processing conditions during the recovery of TDI residues vary widely depending on the batch. This results in the composition of the TDI decomposition products and secondary products being very different each tie. This TDI residue, which is more or less undefined, is subjected to a second distillation or thermal processing with isocyanates of the diphenyl methane series (MDI), resulting in the formation of MDI secondary products such as carbodiimides, urethoneimines, and isocyanurates. In addition to these, there is the possible formation of isocyanurates and uretoneimines, which are formed from TDI and MDI and which remain in the residue on distillation. This results in the composition of polyaromatic polyisocyanate mixtures, such as these being highly variable. Moreover, they contain a very great variety of reaction products and secondary products.

Controlling the distillation process to achieve a reasonable uniformity of composition of the polyaromatic isocyanate mixtures has been shown to be very problematical.

Polyaromatic polyisocyanate mixtures, such as these, exhibit a sharp increase in viscosity within a short time. This viscosity increase is probably the result of a further reaction between the decomposition products and secondary products of TDI and the TDI-MDI residue, described above, and MDI which is present in excess. This viscosity increase can proceed to such an extent that, after a brief storage period of 1–2 months, further processing to form rigid polyurethane foams or use in other fields is no longer possible.

It has been found that stabilization or a retardation of the viscosity increase can be effected by modifying the preferred polyaromatic polyisocyanate mixtures with the cited polyether alcohols.

The present invention relates to a process for producing rigid foamed materials containing urethane groups and optionally isocyanurate groups by the reaction of a) polyisocyanates with b) compounds of molecular weight 400–10,000 containing at least two hydrogen atoms reactive to isocyanates, in the presence of c) water and/or readily volatile organic substances as the foaming agent, optionally in the presence of d) compounds of molecular weight 32–399 containing at least two hydrogen atoms reactive to isocyanates, and e) process materials and additives known in the art, characterized in that aromatic polyisocyanates, which have been modified by reaction with 0.1–10 weight %, preferably 2–7 weight % (based on polyisocyanate), of a polyether alcohol of molecular weight of from 206 to 948, obtainable by the reaction of alkylene oxides with $C_6$–$C_{30}$, preferably $C_8$–$C_{20}$, hydrocarbons containing 1–3 active hydrogen atoms, are used as the polyisocyanates a).

The invention also relates to aromatic polyisocyanates which have been modified by reaction with 0.1–10 weight %, preferably 2–7 weight % (based on polyisocyanate), of a polyether alcohol of molecular weight of from 206 to 948, obtainable by the reaction of alkylene oxides with $C_6$–$C_{30}$, preferably $C_8$–$C_{20}$, hydrocarbons containing 1–3 active hydrogen atoms.

In accordance with the invention, a bottoms product containing isocyanate groups is preferably used, with a content of monomeric tolylene diisocyanate of less than 200 ppm, preferably<50 ppm (by weight), obtained by A) mixing distillation bottoms from tolylene diisocyanate production with B) polyisocyanates or polyisocyanate mixtures of the diphenyl methane series with an NCO content of at least 15 weight %, optionally modified with urethane and/or allophanate, and C) working up the mixture by distillation, the mixture being heated before or during the distillation work-up to temperatures of 190° to 250° C. and by this means substantially replacing the tolylene diisocyanate which is reversibly chemically bound in the distillation bottoms A) by the polyisocyanate B).

The resultant bottoms product is then reacted with 0.1–10 weight %, preferably 2–7 weight % (based on the distillation bottoms), of a polyether alcohol of molecular weight 206 to 948, obtainable by the reaction of alkylene oxides with $C_6$–$C_{30}$, preferably $C_8$–$C_{20}$, hydrocarbons containing 1–3 active hydrogen atoms.

Furthermore, it is preferred, according to the invention, that i) 4,4'-diisocyanatodiphenyl methane, its technical mixtures with 2,4'—and optionally 2,2'-diisocyanatodiphenyl methane isomers with up to 65 weight % based on the mixture of its higher homologues containing more than 2 isocyanate groups per molecule, is used as component B), ii) bottoms products containing NCO groups are used, with which are admixed with 10–80 weight %, preferably 20–60 weight %, of polyisocyanates of the diphenyl methane series, and iii) mixtures of diisocyanato-diphenyl methane monomers with up to 65 weight % (based on the mixture) of their higher homologues containing more than 2 isocyanate groups per molecule are used as the polyisocyanates of the diphenyl methane series.

The following are used for the production of the foamed materials containing urethane groups and optionally isocyanurate groups:

a) aromatic polyisocyanates as described, for example, by W. Stefken, Justus Liebigs Annalen der Chemie, 562, pages 75–136, are used as the starting components, for example those corresponding to the formula

$Q(NCO)_n$, where n=2–4, preferably 2–3, and Q represents an aromatic hydrocarbon radical with 6–15 (and preferably 6–13) carbon atoms, e.g., polyisocyanates such as those described in German Offenlegunschrift 2,832,253, pages 10–11. In general, polyisocyanates which are commercially available are particularly preferred, e.g. 2,4- and 2,6-tolylene diisocyanate, and mixtures of these "TDI" isomers; polyphenylpolymethylene polyisocyanates, as produced by aniline-formaldehyde condensation and subsequent phosgenation ("crude) MDI"); and polyisocyanates containing carbodiimide groups, urethane groups, allophanate groups, isocyanurate groups, urea groups or biuret groups ("modified polyisocyanates"), particularly modified polyisocyanates such as these which are derived from 2,4- and/or 2,6-tolylene diisocyanate or from 4,4'- and/or 2,4'-diphenyl methane diisocyanate.

The above-mentioned modified bottoms products containing NCO groups are preferred according to the invention.

Starting components for the polyethers used for modification comprise alkylene oxides such as ethylene oxide, propylene oxide, butylene oxide and their mixtures on the one hand, and $C_6$–$C_{30}$ hydrocarbons, preferably $C_8$–$C_{20}$ hydrocarbons, containing 1–3 active hydrogen atoms such as stearyl alcohol, stearylamine, dodecyl alcohol, dodecylamine, iso-octyl alcohol or octylamine on the other hand. Polyethers which predominantly contain propylene oxide as the alkylene oxide component are preferred.

b) Other starting components comprise compounds, generally with a molecular weight of 400–10,000, with at least two hydrogen atoms which are reactive with isocyanates. In addition to compounds containing amino groups, thiol groups or carboxyl groups, this definition is understood preferably to comprise compounds containing hydroxyl groups, particularly 2 to 8 hydroxyl groups, particularly those of molecular weight 1000 to 6000, preferably 2000 to 6000, e.g. polyethers and polyesters containing at least 2, generally 2 to 8, and preferably 2 to 6 hydroxyl groups, and also polycarbonates and polyester amides such as are known in the art for the production of homogeneous and cellular polyurethanes, as described, for example, in German Offenlegunschrift 2,832,253, pages 11–18.

c) Water and/or the readily volatile substances known in the art, preferably pentane, isopentane or cyclopentane, is used as the foaming agent.

d) Other starting components are optionally compounds with at least two hydrogen atoms which are reactive to isocyanates and a molecular weight of 32 to 399. Here also this definition is understood to comprise compounds containing hydroxyl groups and/or amino groups and/or thiol groups and/or carboxyl groups, preferably compounds containing hydroxyl groups and/ or amino groups, which serve as chain lengtheners or cross-linking agents. These compounds generally contain 2 to 8, preferably 2 to 4, hydrogen atoms which are reactive to isocyanates. Examples of these are described in German Offenlegunschrift 2,832,253, pages 19–20.

e) Process materials and additives are optionally also used and are generally known to the art. These include catalysts of the type known in the art in quantities of up to 10 weight % based on component b), surface-active additives, such as emulsifying agents and foam stabilizers, and reaction retarders, e.g. materials with an acid reaction such as hydrochloric acid or organic acid halides, and cell regulators of the type known in the art such as paraffins or fatty alcohols or dimethyl polysiloxanes, and pigments or colorants and other flame retardants of the type known in the art, e.g. tricresyl phosphate, and stabilizers effective against ageing and weathering, softeners, fungistatic and bacteriostatic substances, and fillers such as barium sulphate, kieselguhr, whitening chalk or carbon black.

These process materials and additives which may optionally also be used are described, for example, in German Offenlegunschrift 2,732,292, pages 21–24.

Further examples of surface-active additives and foam stabilizers, as well as cell regulators, reaction retardants, stabilizers, flame retardants, softeners, colorants and fillers, and substances with fungistatic and bacteriostatic effects which may also optionally be used, according to the invention, and details on the method of use and mode of action of these additives, are described in the Kunststoff-Handbuch, Volume VII, edited by Vieweg und Höchtlen, Carl-Hanser-Verlag, Runich 1966, e.g. on pages 103–113.

In preparing the rigid foams of the present invention, the reaction components are reacted by the single-stage process known in the art, by the prepolymer process or by the semiprepolymer process, wherein mechanical devices are often employed, e.g. of the type described in U.S. Pat. No. 2,764,565. Details on the processing conditions, which are also relevant in accordance with the invention, are also described in the Kunststoff-Handbuch, Volume VII, edited by Viewag und Höchtlen, Carl-Hanser-Verlag, Munich 1966, e.g. on pages 121–205.

The foamed materials can of course be produced by block foaming or by the double belt process known in the art. The foamed materials which can be obtained according to the invention may be employed, for example, as insulating panels for roof insulation, The Invention is further Illustrated but is not intended to be limited by the following examples in which all parts and percentages are by weight unless otherwise specified.

EXAMPLES

Preparation of the polyethers used for modifying the isocyanate components:

The preparation of a polyether alcohol for modifying the polyaromatic polyisocyanate mixture is carried out under known conditions. The requisite quantities are introduced, e.g. of starters such as isooctyl alcohol, stearyl alcohol or stearylamine, The epoxide is then added at 100°–120° C., employing the usual bases, e.g. NaOH, KOH. The adduct is neutralized and worked up by known methods. The mono- or polyols used for modification are described below as Polyether Examples 1 to 5.

Polyether Example 1

A polyether prepared by the propoxylation of stearyl o alcohol, using 1.350 mole propylene oxide and 0.593 mole ethylene oxide per reactive hydrogen atom of the starter. The resultant polyether had the following characteristics:

| OH value (mg KOH/g) | 150 |
| water content (weight %) | 0.02 |
| average functionality | 1.0 |
| average molecular weight | 374 |

Polyether Example 2

A polyether prepared by the propoxylation of propylene glycol, using 5.643 mole propylene oxide and 3.188 mole ethylene oxide per reactive hydrogen atom of the starter. The resultant polyether had the following characteristics:

| OH value (mg KOH/g) | 112 |
| water content (weight %) | 0.02 |
| average functionality | 2.0 |
| average molecular weight | approx. 1001 |

Polyether Example 3

A polyether prepared by the propoxylation of stearylamine, using 5.693 mole propylene oxide and 0.834 mole ethylene oxide per reactive hydrogen atom of the starter. The resultant polyether had the following characteristics:

| OH value (mg KOH/g) | 270 |
| water content (weight %) | 0.02 |
| average functionality | 2 |
| average molecular weight | approx. 410 |

Polyether Example 4

A polyether prepared by the propoxylation of dodecyl alcohol, using 0.5 mole propylene oxide and 0.13 mole butylene oxide per reactive hydrogen atom of the starter. The resultant polyether had the following characteristics:

| OH value (mg KOH/g) | 248 |
| water content (weight %) | 0.01 |
| average functionality | 1.0 |
| average molecular weight | approx. 226 |

Polyether Example 5

A polyether prepared by the propoxylation of stearyl alcohol, using 5 mole propylene oxide per reactive hydrogen atom of the starter. The resultant polyether had the following characteristics:

| OH value (mg KOH/g) | 101 |
| water content (weight %) | 0.01 |
| average functionality | 1.0 |
| average molecular weight | approx. 560 |

Preparation of the Polyisocyanates to be Modified

Isocyanate Examples 1 and 2 were prepared in accordance with the process of German Offenlegungschrift 4,127,514 (believed to correspond to U.S. Pat. No. 5,314,588 issued on May 24, 1994) wherein a distillate consisting essentially of tolylene diisocyanate and an isocyanate-group-containing bottom product having a tolylene diisocyanate content of less than 200 ppm (by weight) from A) distillation residues from the production of tolylene diisocyanate by mixing of the distillation residues A) with B) polyisocyanates or polyisocyanate mixtures of the diphenyl methane series having an NCO content of at least 15% by weight and working up of the mixture by distillation. As described therein, the mixture is heated to temperatures of 190° to 250° C. before and/or during working up by distillation so that the tolylene diisocyanate reversibly bound in the distillation residue A) is largely substituted by polyisocyanate B).

Isocyanate Example 1

The free TDI was separated by distillation under vacuum from a mixture of 18% of a TDI residue and 82% MDI, the latter consisting of 93% 4,4'-MDI, about 6.5% 2,4'-MDI and 0.5% trinuclear MDI homologues.

The resulting bottoms mixture of polyaromatic polyisocyanates comprising TDI residue and MDI had a residual content of free TDI of 60±20 ppm; the NCO value was 28.3%. The viscosity of the isocyanate mixture after its preparation was about 350 mPa.s at 25° C.; after 6 weeks the viscosity was 850 mPa.s and the NCO value was practically the same. This corresponded to the starting values for the isocyanate identified as Polyisocyanate 1.

Isocyanate Example 2

The free TDI was separated by distillation under vacuum from a mixture of 10% of a TDI residue and 90% MDI, the latter consisting of 53% 4,4'-MDI, about 2.0% 2,4'-MDI and 45% trinuclear and higher nuclear MDI homologues.

The resulting bottoms mixture of polyaromatic polyisocyanates comprising TDI residue and MDI had a residual content of free TDI of 200±20 ppm; the NCO value was 29.2%. The viscosity of the isocyanate mixture after its preparation was about 3000 mPa.s/25° C.; after 8 weeks the viscosity was 4250 mPa.s/25° C. and the NCO value was practically the same. This corresponded to the starting values for the isocyanate identified as Polyisocyanate 2.

Isocyanate Example 3

A polyisocyanate mixture of the diphenyl methane series containing 26.5 weight % of 4,4'-diphenylmethane diisocyanate, 1.5 weight % is 2,4'-diphenylmethane diisocyanate, and 72 weight % higher functional polymeric polyisocyanates of the diphenyl methane series. Viscosity: 2040 mPa.s/25° C.; NCO value: 30.5% NCO. This is called Polyisocyanate 3 in the examples.

Preparation of the Polyisocyanates According to the Invention

Modification Example 1

462.5 g Polyisocyanate 1 were introduced into a three-necked flask fitted with a dropping funnel, thermometer, and nitrogen inlet and outlet. 37.5 g of the polyether of polyether example 1 were then added drop-wise over 3 hours with stirring, under a nitrogen atmosphere at 60° C. The reaction product was then held for 1 hour at 60° C. with continued stirring, and then cooled to room temperature. The reaction mixture obtained had an NCO content of 26.3%. Viscosity: 890 mPa.s/25° C.

Modification Example 2

The reaction mixture from modification example 1 was mixed in a 1:1 ratio with a commercially available polyisocyanate with a viscosity of 200 mPa.s and an NCO value of 32.0 (Desmodur®44 V20; Bayer AG). This produced a processable reaction mixture of a urethane-containing polyisocyanate with a viscosity of 438 mPa.s/25° C. and an NCO value of 29.0% NCO.

Modification Example 3

465 g Polyisocyanate I was reacted with 35 g of the polyether of polyether example 2, in accordance with modification example 1. The resultant product had the following characteristics:

| | |
|---|---|
| NCO value: | 25.8% NCO |
| viscosity: | 1090 mPa · s/25° C. |

Modification Example 4

925 g Polyisocyanate 2 was reacted with 75 g of the polyether of polyether example 1, in accordance with modification example 1. The resultant product had the following characteristics:

| | |
|---|---|
| NCO value: | 26.05% NCO |
| viscosity: | 3680 mPa · s/25° C. |

Modification Example 5

475 g Polyisocyanate 1 was reacted with 25 g of the polyether of polyether example 4, in accordance with modification example 1. The reaction product had an NCO value of 26.1% and a viscosity of 935 mPa.s/25° C. It was surprisingly observed that the fraction of colored components, which in this isocyanate mixture is responsible for the dark-brown coloration on processing to form polyurethane foams, was reduced by the reaction of the isocyanate mixture according to the invention. This was not caused by a dilution effect due to the colorless polyether alcohol; rather, the reduction in coloration was a consequence of the conversion reaction.

Modification Example 6

237.5 g Polyisocyanate 3 was reacted with 12.5 g of the polyether of polyether example 4, in accordance with modification example 1. The reaction product had an NCO value of 28.55% NCO and a viscosity of 2135 mPa.s/25° C.

Modification Example 7

A mixture was prepared at room temperature of 250 g of the product from modification example 6 with 250 g of Polyisocyanate 3. The mixture had an NCO value of 29.5% and a viscosity of 2090 mPa.s/25° C. The depths of color of the MDI polymers and the changes therein were assessed by measuring the extinction coefficients at E=520 nm and E=430 nm, the measurement being made on a solution of 2 g MDI in 100 ml monochlorobenzene (analytically pure) in a photometer, e.g. in an LP 1 W digital photometer (a product of Dr. Lange GmbH, Berlin).

The values measured for modification example 1 showed a clear decrease in the extinction coefficient. At E 430 nm the initial value (isocyanate example 1) was reduced from E=1352 to E=1068, and at E 520 nm was reduced from E=0.435 to E= 0.277.

As a comparison with the color-reducing effect due to the urethane-containing aromatic isocyanate mixture produced from the polyether alcohol, the dilution effect was determined. As is known, the polyether alcohol is a colorless liquid. The starting isocyanate was diluted with the same amount of an inert solvent (monochlorobenzene), and its extinction coefficient was then measured under the same conditions.

|  | E 430 nm | E 520 nm |
| --- | --- | --- |
| Initial value: Isocyanate 1 | 1.352 | 0.435 |
| Diluted with 7.5% monochlorobenzene | 1.323 | 0.410 |
| Modification example 1 (reaction with 7.5% polyether alcohol) | 1.068 | 0.277 |

The values confirm that a lightening effect is achieved by the prepolymerization according to the invention.

A viscosity-stabilizing effect can surprisingly be achieved by the reaction of the polyether monohydric alcohols used according to the invention with the isocyanate mixture. The known viscosity increase of the polyaromatic polyisocyanate mixture probably results from a further reaction between the TDI, MDI and TDI-MDI secondary products present in the isocyanate mixture with MDI present in excess, and can be reduced by the formation of urethane-containing compounds in the isocyanate mixture.

Isocyanate 1 exhibited a viscosity increase from 850 to 1840 mPa.s/25° C. after 5.5 months, while modification example 1 (a urethane-containing polyaromatic isocyanate mixture according to the invention) exhibited a viscosity increase from 813 mPa.s to 1480 mPa.s.

Polyaromatic polyisocyanate mixtures as described in isocyanate example 1 have a lower solubility for the alternative foaming agent pentane compared with a commercially available polymeric MDI such as Desmodur®44 V 20 (Bayer AG). However, it has surprisingly been found that a significant improvement in alkane absorption capacity is effected by the reaction of polyaromatic polyisocyanate mixtures such as these with a polyether alcohol according to the invention, as shown in modification example 1. The alkane absorption capacity was determined by introducing SO ml polyisocyanate and 50 ml pentane into a graduated, stoppered, 100 ml measuring cylinder, shaking well, and reading off the position of the phase boundary from the cylinder graduations after 15 mins. The position of the phase boundary is a measure, in volume percent, of the absorption capacity of the polyisocyanate for pentane.

| Polyisocyanate | Isocyanate phase boundary in the measuring cylinder | Pentane dissolved in the isocyanate (vol. %) |
| --- | --- | --- |
| Desmodur 44 V 20 | 55 ml | 10% |
| Isocyanate example 1 | 52 ml | 4% |
| Modification example 1 | 56 ml | 12% |
| Isocyanate example 3 | 54 ml | 8% |
| Modification example 6 | 70 ml | 40% |
| Modification example 7 | 61 ml | 22% |

Production of Foam Materials

The polyisocyanate mixtures according to the invention obtained in accordance with modification examples 1 to 3 were used for the production of rigid foam test pieces.

Foam Example 1

Starting materials

Polyol component 1

1. 100 parts by weight of a commercially available polyol mixture for rigid PU foam, with an OH value of 500 and with a viscosity of 4100 mPa.s at 25° C.,
2. 3 parts by weight tris-(chloroisopropyl)phosphate as flame retardant,
3. 1.5 parts by weight of a commercially available polyetherpolysil oxane foam stabilizer (Tegostab ®B 8404, Goldschmidt AG, Essen),
4. 10 parts by weight X,X-dimethylcyclohexylamine as the catalyst,
5. 0.6 parts by weight water,
6. 35 parts by weight trichlorofluoromethane as the foaming agent.

Isocyanate components 175 parts by weight of the product from modification example 4 or 135 parts by weight of Desmodur® 44 V 20, a commercially available polyisocyanate (corresponding to an isocyanate characteristic number of 110 in each case).

The mixture of polyol, flame retardant, stabilizer, activator and water was fed to a multi-component proportioning mixer unit and mixed with polyisocyanate in a mix head, and then immediately introduced into a mold which was closed on all sides. The mixture began to foam immediately and set after about 30 seconds each time. The molding (:100×100×7 cm) was removed from the mold after 15 minutes.

The molding had an outer layer which was dosed on all sides and a cellular core. The rigid polyurethane foams obtained were commensurate with the known specifications, such as cell size, cell structure, adhesion, shrinkage and water absorption.

Foam Example 2

Starting materials

Polyol component 2

1. 102.7 parts by weight of a commercially available polyol mixture for rigid PU foam, with an OH value of 481 and with a viscosity of 1600 mPa.s at 25° C., containing 1.5 parts by weight water and 1.2 parts by weight of the commercially available polyether polysiloxane foam stabilizer PU 1783 (Bayer AG, Leverkusen),
2. 0.7 parts by weight water,
3. 9 parts by weight pentane as the foaming agent.

Foam Example 3

Starting materials

Polyol component 3

1. 100 parts by weight of a commercially available polyol mixture for rigid PU foam, with an OH value of 345 and a viscosity at 25° C. of 2300 mPa.s,
2. 2.2 parts by weight water,
3. 2 parts by weight of the commercially available polyether polysiloxane foam stabilizer PU 1783 (Bayer AG, Leverkusen), 4. 9 parts by weight pentane as the foaming agent.

The polyol components of Foam Examples 2 and 3 were mixed with N,N-dimethylcyclohexylamine as the activator and with isocyanate components, corresponding to the formulations given in Table 1, and introduced into a mold which was closed on all sides. Each foam set after about 30 seconds. The molding (100×·×100×7 cm) was removed after 15 minutes. It had an outer layer closed on all sides and a cellular core.

The rigid polyurethane foams obtained, were commensurate with the known specifications in terms of cell size, cell structure, bonding, shrinkage and water absorption. The foam formulations and properties of the resultant foams were as specified in Tables 1 and 2.

TABLE 1

| Formulation (parts by weight) | 1 | 2 | 3 | 4 | 5 | 6 |
|---|---|---|---|---|---|---|
| Polyol component 2 | 112.4 | 112.4 | 112.4 | — | — | — |
| Polyol component 3 | — | — | — | 113.2 | 113.2 | 113.2 |
| Dimethyl-cyclo-hexylamine | 1.1 | 1.0 | 1.2 | 1.1 | 1.0 | 1.2 |
| Desmodur-44 V 20 (Bayer AG) | 141 | — | — | 139 | — | — |
| Poly-isocyanate 2 | — | 152 | — | — | 150 | — |
| Poly-isocyanate from modification example 4 | — | — | 171 | — | — | 168 |
| Isocyanate index | 110 | 110 | 110 | 110 | 110 | 110 |
| Reaction start-up time (sec.) | 18 | 16 | 20 | 16 | 18 | 18 |
| Setting time (sec.) | 47 | 47 | 49 | 44 | 44 | 45 |
| Intrinsic bulk density (kg/m³) | 33 | 35 | 37 | 33 | 34 | 37 |

TABLE 2

| | Results of foamed material tests | | | | | |
|---|---|---|---|---|---|---|
| Formulation No. | 1 (comparative) | 2 (comparative) | 3 (according to the invention) | 4 (comparative) | 5 (comparative) | 6 (according to the invention) |
| Surface | tenacious | tenacious | tenacious | tenacious | tenacious | tenacious |
| Cell size | fine | fine | fine | fine | fine | fine |
| Cell structure | uniform | uniform | uniform | uniform | uniform | uniform |
| Adhesion after 8 min. | + | — | + | + | — | + |
| Adhesion after 24 hours | + | − | + | − | − | + |
| Full hardening | ++ | ± | ++ | ++ | ± | ++ |
| Base defects | slight | severe | none | slight | severe | none |
| Open | 7 | 25 | 7 | 6 | 20 | 5 |

The foamed materials produced using the isocyanate components, according to the invention, have the same properties in terms of surface, cell size and cell structure as the materials from the comparative examples.

Regarding the adhesion of paper covering layers, full hardening and open cellularity, they attain the values obtained using Desmodur® 44 V 40 (Bayer AG). A pronounced advantage compared with the comparative examples is the freedom of the base region from defects.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing rigid foamed materials containing polyurethane groups and optionally isocyanurate groups by the reaction of a) one or more polyisocyanates with b) one or more compounds having molecular weights of from 400 to 10,000 and containing at least two hydrogen atoms reactive to isocyanates, in the presence of c) water and/or readily volatile organic substances as the foaming agent, optionally in the presence of d) one or more compounds of molecular weight 32 to 399 containing at least two hydrogen atoms reactive to isocyanates, the improvement wherein polyisocyanate a) is an aromatic polyisocyanate comprising a bottoms product containing isocyanate groups with a tolylene diisocyanate content less than 200 ppm, and is obtained by A) mixing distillation bottoms from tolylene diisocyanate production with polyisocyanates or polyisocyanate mixtures of the diphenyl methane series with an NCO content of at least 15 weight %, optionally modified with urethane and/or allophanate, B) working up the mixture by distillation, the mixture being heated before or during distillation work-up to temperatures of 190° to 250° C. and by this means substantially replacing the tolylene diisocyanate which is reversibly chemically bound in the distillation residue by the polyisocyanate mixed therewith, and C) reacting the distillation bottoms obtained in step B) with 0.1–10 weight % of a polyether alcohol of molecular weight from 206 to 948, said polyether alcohol being obtained by the reaction of alkylene oxides with $C_6$–$C_{30}$ hydrocarbons containing 1–3 active hydrogen atoms.

2. The process of claim 1, wherein said polyether alcohol is used in an amount of from 2 to 7 weight % and wherein said hydrocarbon is a $C_8$–$C_{20}$ hydrocarbon.

3. The process of claim 1, wherein the isocyanate mixed in step A) is selected from the group consisting of 4,4'-diisocyanatodiphenyl methane, its technical mixtures with 2,4'- and optionally 2,2'-diisocyanatodiphenyl methane and mixtures of these diisocyanatodiphenyl methane isomers with up to 65 weight % (based on the mixture) of their higher homologues containing more than 2 isocyanate groups per molecule.

4. The process of claim 1, wherein in step A), said tolylene diisocyanate bottoms contain NCO groups and are mixed with from 20–80 weight % of polyisocyanates of the diphenyl methane series.

5. The process of claim 1, wherein mixtures of diisocyanato-diphenyl methane isomers with up to 65 weight % (based on the mixture) of their higher homologues containing more than 2 isocyanate groups per molecule are admixed as polyisocyanates of the diphenyl methane series in step A).

* * * * *